(12) United States Patent
Fabrikant

(10) Patent No.: US 10,977,564 B1
(45) Date of Patent: *Apr. 13, 2021

(54) USING TEMPORAL PROXIMITY OF NEWLY FORMED RELATIONSHIPS TO PREDICT COMMON FEATURES

(71) Applicant: GOOGLE LLC, Mountain View, CA (US)

(72) Inventor: Alexander Fabrikant, Palo Alto, CA (US)

(73) Assignee: Google LLC, Mountain View, CA (US)

(*) Notice: Subject to any disclaimer, the term of this patent is extended or adjusted under 35 U.S.C. 154(b) by 430 days.

This patent is subject to a terminal disclaimer.

(21) Appl. No.: 15/442,578

(22) Filed: Feb. 24, 2017

Related U.S. Application Data

(63) Continuation of application No. 13/908,918, filed on Jun. 3, 2013, now Pat. No. 9,582,460.

(51) Int. Cl.
*H04L 29/08* (2006.01)
*G06N 5/04* (2006.01)
*G06N 7/00* (2006.01)
*H04L 12/58* (2006.01)

(52) U.S. Cl.
CPC .............. *G06N 5/04* (2013.01); *G06N 7/005* (2013.01); *H04L 51/32* (2013.01); *H04L 67/306* (2013.01)

(58) Field of Classification Search
CPC ......... H04L 51/32; H04L 67/306; G06N 5/04; G06N 7/005

USPC ......................................................... 709/224
See application file for complete search history.

(56) References Cited

U.S. PATENT DOCUMENTS

| | | | |
|---|---|---|---|
| 7,219,307 B2 * | 5/2007 | Senay | G06Q 10/10 715/764 |
| 9,946,430 B2 * | 4/2018 | Lessin | G06F 3/0481 |
| 2006/0256959 A1 | 11/2006 | Hymes | |
| 2008/0189169 A1 * | 8/2008 | Turpin | G06Q 30/02 705/7.33 |
| 2009/0150514 A1 * | 6/2009 | Davis | H04L 29/12028 709/217 |
| 2009/0319288 A1 | 12/2009 | Slaney et al. | |
| 2012/0054691 A1 | 3/2012 | Nurmi | |
| 2012/0271957 A1 * | 10/2012 | Carney | G06Q 10/107 709/228 |
| 2015/0074559 A1 * | 3/2015 | Garcia | G06Q 50/01 715/753 |
| 2015/0254064 A1 * | 9/2015 | Han | G06F 7/32 707/725 |
| 2017/0199920 A1 * | 7/2017 | Pearson | G06F 16/258 |

* cited by examiner

*Primary Examiner* — Ario Etienne
*Assistant Examiner* — Sahera Halim
(74) *Attorney, Agent, or Firm* — Lowenstein Sandler LLP

(57) ABSTRACT

Temporal proximity of newly formed social relationships is used to determine the likelihood of common features being shared by users in the newly formed social relationships. The respective times in which each of a plurality of new relationships are formed are determined to be related to each other, and user information associated each of a plurality of respective contact accounts who are the subject of the new relationships are compared, and a common feature likely shared by the respective contact accounts is identified based on the comparing.

12 Claims, 4 Drawing Sheets

USING TEMPORAL PROXIMITY OF NEWLY FORMED RELATIONSHIPS TO PREDICT COMMON FEATURES

CROSS-REFERENCE TO RELATED APPLICATIONS

The present application claims the benefit of priority under 35 U.S.C. § 120 as a continuation of U.S. patent application Ser. No. 13/908,918 entitled "Methods for Using Temporal Proximity of Social Connection Creations to Predict Properties of a Social Connection," filed on Jun. 3, 2013, the disclosure of which is hereby incorporated by reference in its entirety for all purposes.

BACKGROUND

The disclosed subject matter provides a method for making inferences about information pertaining to users and/or groups of users in a social network.

In general, conventional social networking systems (SNSs) receive information that is explicitly provided or generated by its users. For example, a typical SNS might receive a list of (1) a user's social connections (edges), (2) attributes of the social connections that are explicitly provided by the user, and/or (3) information regarding properties of real-world communities or organizations related to the user's social connections.

SUMMARY

The disclosed subject matter relates to a social-networking system including one or more computers communicatively coupled via a network, wherein the one or more computers are configured to perform operations comprising, receiving one or more indications that a common user has initiated a connection with each of a plurality of contacts in a social network and identifying two or more contacts, from among the plurality of contacts, that share a temporal relationship with respect to the connections formed between the common user and the respective two or more contacts in the social network. In certain implementations, the one or more computers are further configured to perform operations for comparing information associated with the two or more contacts to determine a likelihood that a common feature is shared by the two or more contacts.

In another aspect, the subject technology relates to a computer-implemented method, including receiving one or more indications that a common user has initiated a connection with each of a plurality of contacts in a social network, identifying two or more contacts, from among the plurality of contacts, that share a temporal relationship with respect to the connections formed between the common user and the respective two or more contacts in the social network; and comparing information associated with the two or more contacts to determine a likelihood that a common feature is shared by the two or more contacts, wherein the common feature comprises an explicit feature based on information provided to the social-networking system by at least one of the two or more contacts.

In another aspect, the subject technology relates to a computer-readable storage medium comprising instructions stored therein, which when executed by one or more processors, cause the one or more processors to perform operations including receiving one or more indications that a common user has initiated a connection with each of a plurality of contacts in a social network and identifying two or more contacts, from among the plurality of contacts, that share a temporal relationship with respect to the connections formed between the common user and the respective two or more contacts in the social network. In some implementations, the processors can be configured to further perform operations for comparing information associated with the two or more contacts to determine a likelihood that a common feature is shared by the two or more contacts, wherein the likelihood that a common features is shared by the two or more contacts is based on information provided to the social-networking system by at least one of the two or more contacts.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
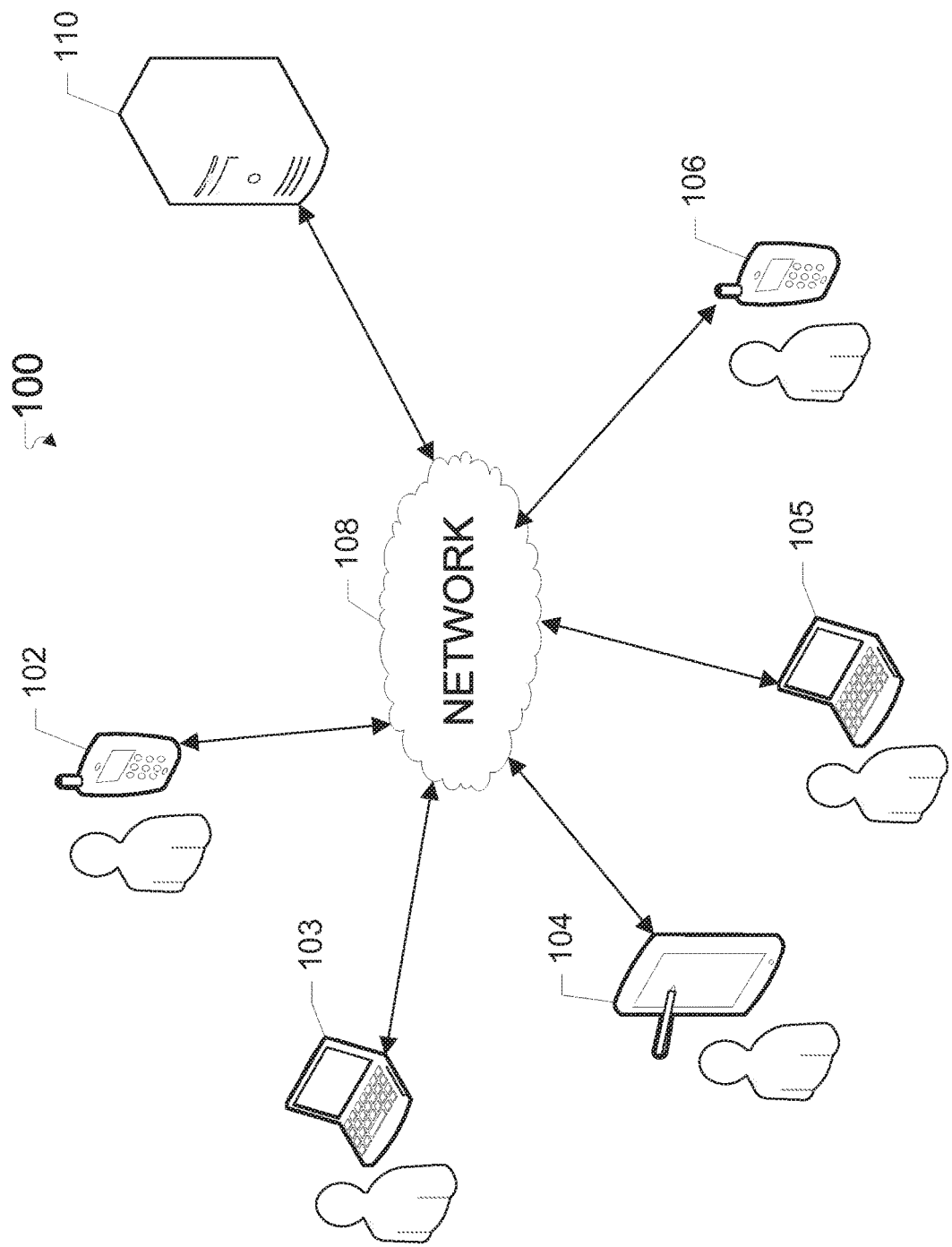
FIG. 1 illustrates an example of a network system that can be used to implement certain aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

A social-networking system can include multiple processor based devices (e.g., mobile devices, computers, servers, etc.) that are connected via a network, such as the Internet. Social-networking systems can be used to host social networking sites (e.g., websites or portals) for which various users can communicate via a social network.

As used herein, the phrases "social networking site," "social networking system," and/or "social network" can encompasses their plain and ordinary meaning, including, but not limited to, an online service, platform, network or website that is configured to facilitate and reflect social associations among users. Associations between users can be stored as a social graph, for example, on one or more computers that form part of the social-networking system. Associations between users can be defined on a user-to-user basis, or as a group of users associated through membership within a group. As used herein, the terms "social networking contacts," "contact(s)" and "user associate(s)" refer to other users that a particular user is associated with via one or more social networking sites.

In certain aspects, users can create groups (e.g., social circles or circles) including one or more contacts to organize his/her associations with other users of the social network. Social groups can be used to control and manage the distribution of content and messages between users. For example, groups or circles can be based on (user defined) categories to which a user can assign their social networking contacts. Assignment to a particular group or circle can enable users to more easily control the distribution and visibility of content (e.g., multimedia, documents, and/other collaboration objects, etc.). In accordance with the subject disclosure, a social circle is provided as a data set defining a collection of contacts that are associated with one another on the basis of a shared feature, such as a relationship to a common user. As such, a social circle can be described from the perspective of an individual that is the center of a particular collection of socially interconnected users, or from the aggregate perspective of a collection of socially interconnected people. In some examples, a social circle can have narrowly defined boundaries, wherein all members of the social circle may be familiar with one another, and permission may be required for an additional member to join.

In accordance with the subject technology, a user of an electronic device may define a social circle as a data set defining a collection of contacts that reflect a real-life social group of the user. For example, a user can create various circles by adding users to a circle. Different circles can be associated with different categories of the user's contacts, such as different groups of friends, coworkers, and family, etc., or may be organized based on a topic or interest that is chosen by the user.

The ability to discern information related to a user's social connections is desirable because it can enable the enhancement of different aspects of a social networking system (SNS). The subject technology provides improved ways to infer information, such as common features or interests, for users that are identified from among multiple connections created by a common user. In some implementations, a sub-group of connections created by a common user can be identified based at least in part on a temporal proximity in which the connections were created.

Aspects of the subject technology rely on the assumption that social contacts (edges) created in quick succession are more likely to share common features or qualities than those that are distantly spaced in time. This assumption is based on the observation that users often have particular qualities or features in mind when adding social contacts, and as such, contacts added in quick succession are likely to share common features. Although, some shared features can be determined using information that is explicitly provided (e.g., to the SNS), other features can be inferred based on information that has not been explicitly provided to the SNS.

For example, features may be inferred by the SNS using various other methods that may be performed prior to or while various aspects of the subject technology are being performed.

The time span in which newly created contacts of a common user will be considered to be in close temporal proximity can vary depending on implementation. In some implementations, the time span may be based on a predetermined threshold. For example, a timer may be started once a user creates a new contact or edge in the SNS. Subsequently, each contact added within the predetermined threshold period is considered to be of close temporal proximity. In other implementations, a decay function can be used to determine which newly created contacts or edges are deemed to possibly be related.

By way of example, a first user (e.g., Alice) may decide to connect with different contacts from her home town. Connections between Alice and each of the contacts are created in rapid succession, for example, because Alice has pre-identified each of them based on their shared connection with the same home town. Based on the close temporal proximity of Alice's connections with each of the contacts, information about the contacts can be compared/analyzed to determine if there are any explicit (or implicit) features that are shared between the contacts. Out of five newly created contacts, only three may explicitly provide their shared home town as a place where they once lived, for example, on their respective SNS profiles. However, based on the temporal proximity of each of Alice's newly created contacts, it may be inferred that the remaining two contacts are likely to also have ties to the same home town. Thus, explicit information for a user may be inferred based on information that has been provided by one or more other users for which similar connections have been recently created.

In yet another example. Alice may connect with each of the five different contacts in the social network. Out of the five contacts, none may have explicitly provided or indicated their hometown (e.g., to the SNS). However, two of the contacts may make reference their hometown, for example, in user posts. Furthermore, one of the five contacts may provide information about his/her hometown via geo-tagged photographs, whereas two of the five contacts may provide no information about their hometown. Based on the temporal relationship for connections formed with Alice, information regarding the contact that have provided no information may be inferred. For example, it may be inferred that the two contacts that have provided no information have ties to the same hometown as the other three contacts.

Depending on implementation, information regarding explicit/implicit features for a user (or a group of users) may be used in various ways. By way of example, feature information for a user may be used to suggest additional social networking contacts, prompt the user to fill out portions of a user profile, and/or used to organize/deliver content to the user, for example, in a social networking feed.

FIG. 1 illustrates an example of a network system 100 that can be used to implement some aspects of the subject technology. Network system 100 includes user devices (e.g., first user device 102, second user device 103, third user device 104, fourth user device 105 and fifth user device 106), and server 110. As illustrated, each of user devices 102-106 is communicatively coupled to server 110 via network 108. It is understood that in addition to the user devices and server 110, any number of other processor-based devices could be communicatively connected to network 108. Furthermore, network 108 can represent multiple networks, such as a network of networks, e.g., the Internet.

Network system 100 can be used to implement a SNS in which multiple users can communicate. For example, users associated with the user device can interact with one another through a social network supported by network system 100. By way of example, one or more servers (e.g., server 110) can host a web site or web portal for access to the social network in which users associated with the user devices can log-in to interact.

Networking system 100 may support a symmetric social network in which users can form connections (edges) with other users only after the other users indicate their acceptance of the connection and/or reciprocate the connection. Alternatively, networking system 100 can support an asymmetric social network that allows users to unilaterally add, connect or follow other users, without the need for the other users to reciprocate the connection or indicate their acceptance. For either symmetric or asymmetric social networking implementations, an adding user's ability to view information pertaining to a receiving user may be limited by the receiving user's privacy settings.

By way of example, a first user associated with first user device 102 may decide to connect with or follow each of the users associated with user devices 103, 104, 105, and 106. Based on the temporal relationship between the time connections are created between the first user and each of the users associated with user devices 103-106, all of (or a subset of) the users associated with user device 103-106 may be analyzed to identify common qualities or features.

Figure 2:
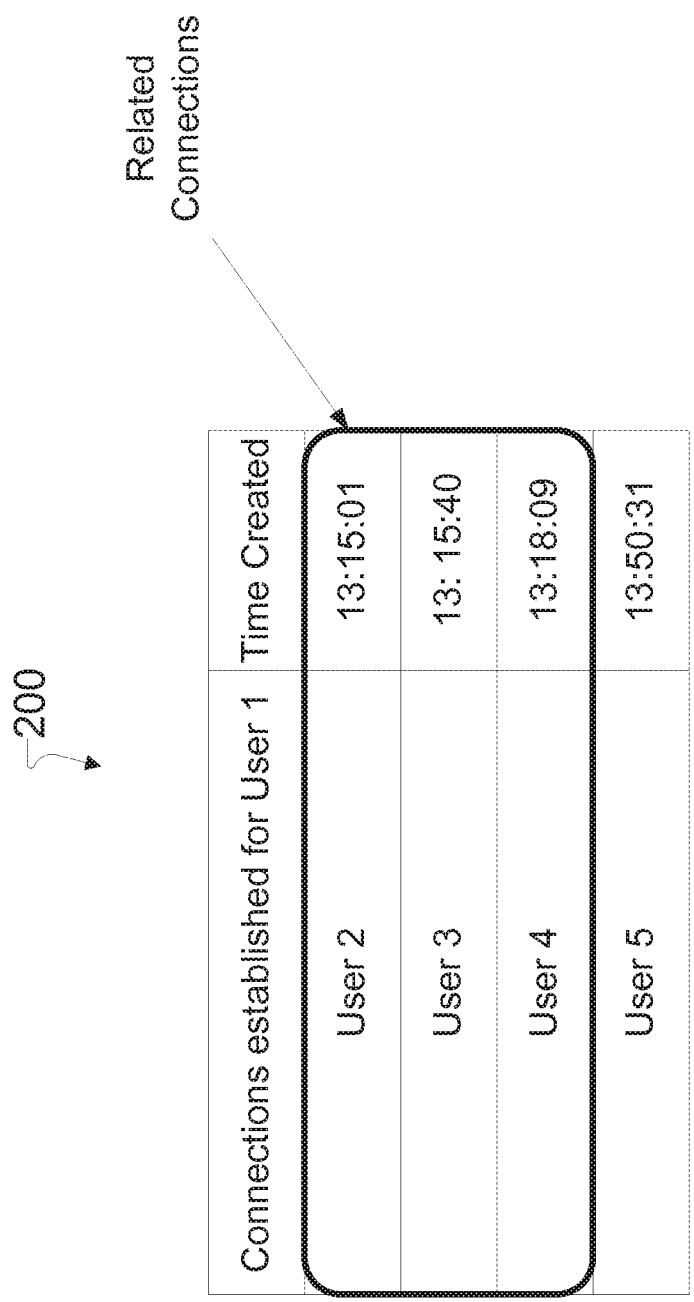
FIG. 2 provides an example table that conceptually illustrates a temporal relationship between newly created connections in a social network.

FIG. 2 provides an example table 200 that conceptually illustrates a temporal relationship between newly created connections in a social network. Specifically, table 200 illustrates times associated with various connections that have been created between a common user (e.g., user 1) and multiple other users (e.g., user 2, user 3, user 4 and user 5). Further to the example discussed with respect to FIG. 2, user 1 can represent a user associated with user device 102. Similarly, user 2, user 3, user 4 and user 5 can each represent users that are associated with user device 103, 104, 105 and 106, respectively.

As shown in table 200, a connection between user 1 and user 2 is formed at time 13:15:01, a connection between user 1 and user 3 is formed at time 13:15:40, a connection between user 1 and user 4 is formed at time 13:18:09, and a connection between user 1 and user 5 is formed at time 13:50:31. Based the temporal proximity for connections created between user 1 and each of users 2, 3 and 4, a SNS may identify users 2, 3 and 4 as a sub-group for which common features or qualities may be shared. However, the connection formed between user 1 and user 5 may be deemed not to be within a close temporal proximity to the formation of the other connections. It is understood that the window of time in which newly created connections will be considered to be in "close temporal proximity" can vary with implementation.

In some aspects, a predetermined time limit beginning from the creation of a particular connection can be used to define what connections are considered to be within a close temporal proximity of one another. For example, new connections created within a two hour time span of each other may be considered to be related. Further to the example of FIG. 3, the connections between user 1 and each of users 2, 3 and 4 occur within a two hour window, and thus are considered to be a related sub-group of connections.

Once a sub-group of connections has been identified as being related in time, the users associated with those connections can be compared to identify common qualities or properties that may be shared amongst them. Further to the example of FIG. 2, information for each of users 2, 3 and 4 (which are identified as related connections), can be compared to determine if they share any explicit or implicit qualities. As discussed above, explicit qualities can include any information that may be explicitly provided by one or more of the users to the SNS, whereas implicit qualities can pertain to common qualities that are inferred by comparing various types of information that are known about the users.

By way of example, user 2 and user 3 could provide an explicit indication of interest in a particular subject, such as film, to the SNS. Based on the explicit information provided by user 2 and user 3, it may be inferred that user 4 may also have an interest in film.

In another example, user 1, user 2, and user 3 could provide an explicit indication of previous employment at company A. Based on the explicit information provided by users 1, 2, and 3, it may be inferred that user 4 has a significant probability of also having worked for company A, based on the likelihood that user 1 created connections to users 2, 3, and 4 while thinking about his colleagues at company A.

In yet another example, user 1 may have had an implicitly-inferred association with company A, such as by associating his/her social networking account with a corporate email address owned by company A; user 2 may have had a different implicitly-inferred association with company A, such as by creating a post containing text such as 'when I worked at A.' Additionally, user 3 may have explicitly indicated that A is a previous employer. Under these circumstances, it may also be inferred that user 4 has a significant probability of also having worked for A, based on the likelihood that user 1 created connections to users 2, 3, and 4 while thinking about his colleagues at company A.

Once a sub-group of connections has been identified as being related in time, the various information about these users (e.g., that the SNS has received via explicit user input or implicit inference) can be analyzed to establish what characteristics, if any, are both common among enough of these users and likely to be correlated with the temporal proximity of social connection creations. In certain aspects, this analysis can be based on historical data about commonalities in subgroups of users that have been added in rapid succession by other users.

By way of example, the system may compare the relevance of a "same high school" commonality versus the relevance of a "same eye color" commonality by observing that, in a corpus of previous temporally-proximal social connection groups, for example, with 6 people, having 3 people explicitly list the same high school raised the likelihood of the other 3 people explicitly listing the same high school by a factor of 7.5, while having 3 people explicitly list "brown eyes" did not statistically significantly affect the likelihood of the other 3 people explicitly listing "brown eyes." In this scenario, a new temporally-proximal group with some commonality in "high school" data should be posited to have a high probability of being all linked to the same high school. In contrast, a temporally-proximal group with some commonality in "eye color" data should not be posited to have a high probability of having all the same eye color.

The discovery of qualities and/or features that are shared between users (or groups of users) can be used in various ways depending on implementation. In some aspects, the information regarding common features may be used to make suggestions, for example to a common user, regarding one or more user groups that his/her social networking contacts may be included in.

Figure 3:
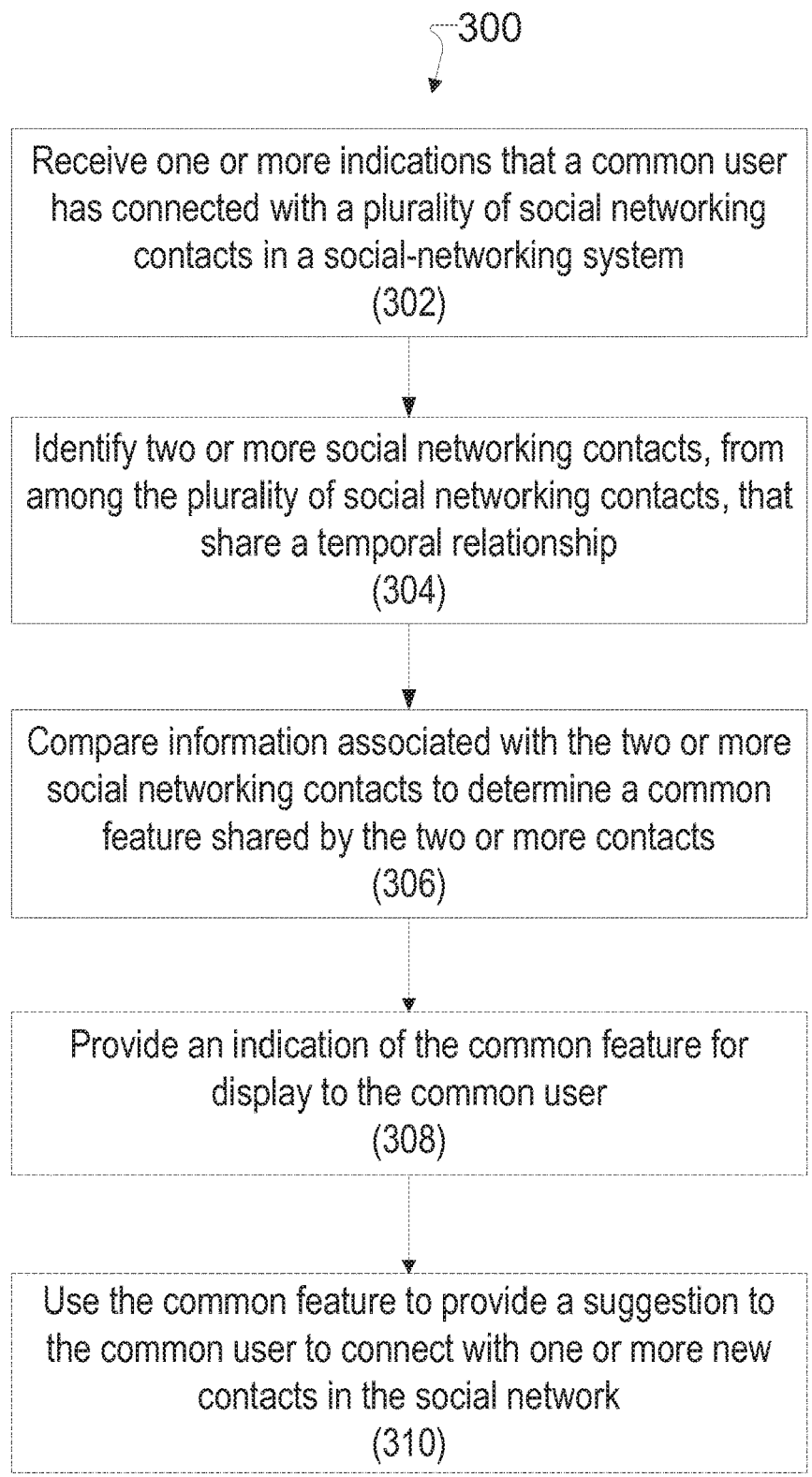
FIG. 3 illustrates steps of an example method for determining a common feature shared by social networking contacts, according to certain aspects of the subject technology.

FIG. 3 illustrates steps of an example method 300 for determining a common feature shared by social networking contacts (e.g., temporally related users in a user sub-group), according to certain aspects of the technology. Method 300 begins with step 302, in which indications that a common user has initiated a connection with a plurality of contacts in a social network are received, for example, by a server or computer forming a part of the SNS.

By way of example, indications that connections (edges) have been formed between the common user and the social networking contacts can result from the common user adding the social networking contacts to one or more user groups or circles. Depending on implementation, the common user may add each of the social networking contacts to the same user group or circle, or to different groups/circles. As such, temporal relationships between various social networking contacts can be determined independently of how the common user decides to categorize each of the newly added social networking contacts.

In step 304, two or more contacts are identified, from among the plurality of social networking contacts, that share a temporal relationship. As discussed above, each of the plurality of social networking contacts may be identified based on a time that a respective connection with the common user is created. The time span in which two or more networking contacts are considered to share a temporal relationship can vary depending on implementation. As discussed above, in some aspects a predefined period of time may be used to determine if newly created networking contacts are related. Additionally, in some implementations, a decay function may be used to estimate strength of a temporal relationship between newly related contacts, and that strength may be used to modulate the resulting inferences.

By way of example, a decay function may be used to label any contacts created with no pauses of length more than 1 minute as belonging to a subgroup with strength 1, and any contacts created after a pause of k minutes with strength ½^k, and with strength 0 when k is at least 5. Then, if users 1, 2, 3, and 4, are added at 13:01:10, 13:01:31, 13:01:40, and 13:04:40, respectively, they are considered to constitute a possible subgroup, with commonality inferences about 1, 2, and 3, weighted by a factor of 1, and inferences about 4 weighted by a factor of ⅛. In some implementations, this may cause the system to act on the inferences with regard to users 1, 2, and 3 independently of other inputs, but to only act on the inferences for user 4 if there are other inputs that strengthen the system's confidence in the inference.

In step 306, information associated with the two or more contacts is compared to determine a likelihood that a common feature is shared by the two or more contacts. The information that is compared between any two social networking contacts can vary with implementation. As discussed above, explicit information that has been provided by the social networking contacts can be analyzed to determine if any common features or qualities exist. Additionally, any information that is known for the social networking contacts may be compared, for example, to infer implicit qualities or features that may are shared between the contacts.

Common qualities or features that are discovered between two or more social networking contacts may be used in various ways. For example, in step 308, a reminder of the common feature can be provided for display to the common user. Additionally, in certain aspects a reminder of the common feature may be provided to one or more other users or user groups of the SNS, such as contacts of the common user or groups of contacts sharing similar qualities.

In some implementations, the common user may use the reminder of the common feature to categorize or group his/her social networking contacts. Further to the above example, if the common user is provided with a reminder that user 4 may have an interest in film, the common user may decide to add user 4 to a group or circle pertaining to a similar topic area.

Additionally, the common feature may be used by the SNS to provide various types of information to users. By way of example, based on the inference that the common user intentionally added a subgroup of contacts with explicit and/or inferred interest in film in rapid temporal succession, it may be inferred that the common user would likely be interested in connecting with other users who share an interest in film. As such, the common feature may be used to make recommendations to the common user, for example, to add/connect with other social networking users that also share an interest in film.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives. RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
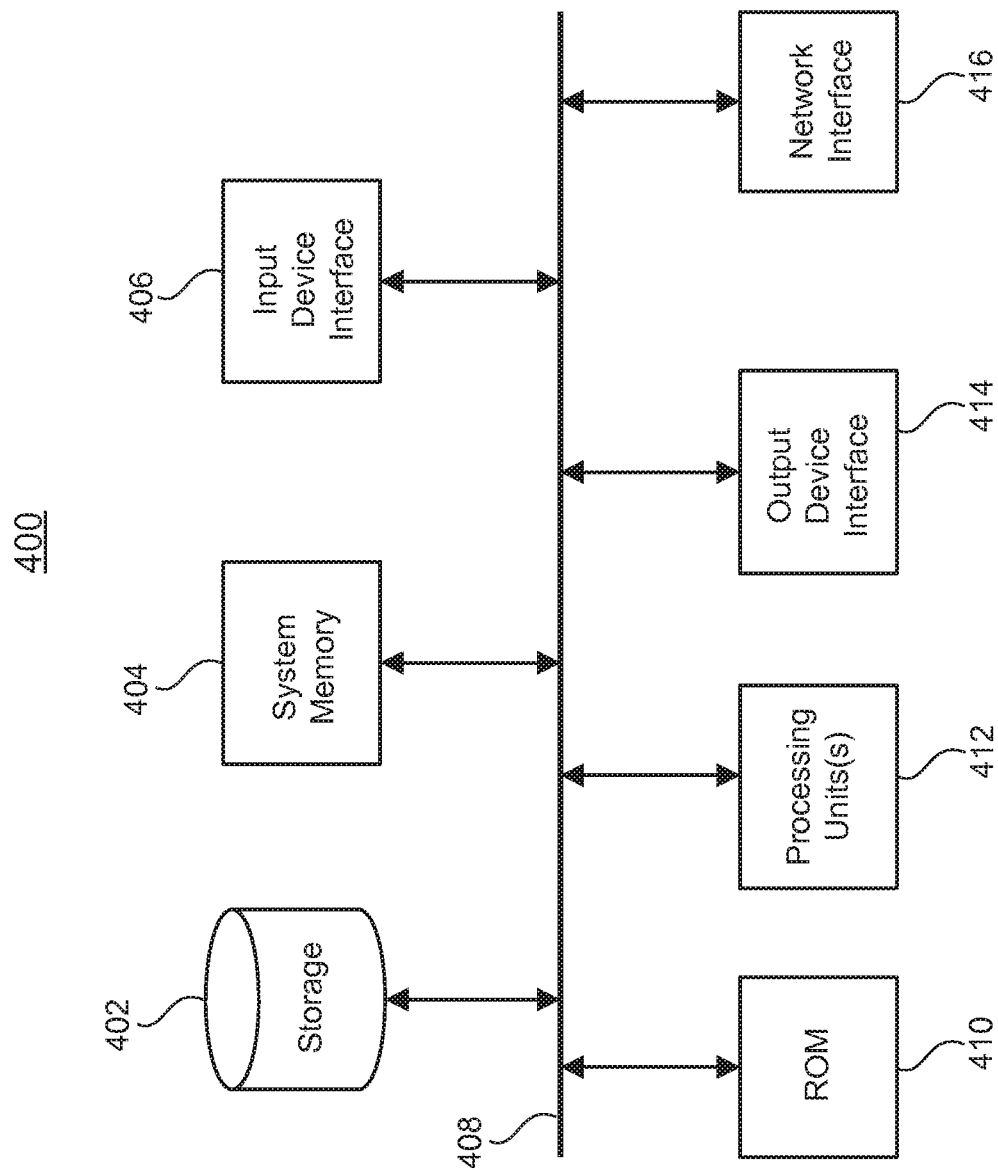
FIG. 4 illustrates an example of an electronic system with which some aspects of the subject technology can be implemented.

FIG. 4 conceptually illustrates an electronic system 400 with which some implementations of the subject technology are implemented. Electronic system 400 can be a computer, phone, PDA, or any other sort of processor-based electronic device. Such an electronic system can include various types of computer readable media and interfaces for various other types of computer readable media. Electronic system 400 includes bus 408, processing unit(s) 412, system memory 404, read-only memory (ROM) 410, storage device 402, input device interface 406, output device interface 414 and network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and storage device 402.

From these various memory units, processing unit(s) 412 retrieves instructions to execute and data to process in order to execute the processes of the subject disclosure. The processing unit(s) can be a single processor or a multi-core processor in different implementations. ROM 410 stores static data and instructions that are needed by processing unit(s) 412 and other modules of the electronic system. Storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as storage device 402.

Other implementations use a removable storage device (such as a floppy disk, flash drive, and its corresponding disk drive) as storage device 402. Like storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, storage device 402, and/or ROM 410. For example, the various memory units include instructions for conducting experiments in accordance with some implementations. From these various memory units, processing unit(s) 412 retrieves instructions to execute and data to process in order to execute the processes of some implementations.

Bus 408 also connects to input and output device interfaces 406 and 414. Input device interface 406 enables the user to communicate information and select commands to the electronic system. Input devices used with input device interface 406 include, for example, alphanumeric keyboards and pointing devices (also called "cursor control devices"). Output device interface 414 enables, for example, the display of images generated by the electronic system 400. Output devices used with output device interface 414 can include, for example, printers and display devices, such as cathode ray tubes (CRT) or liquid crystal displays (LCD). Some implementations include devices such as a touchscreen that functions as both input and output devices.

Finally, as shown in FIG. 5, bus 408 also couples electronic system 400 to a network (not shown) through network interface 416. In this manner, the computer can be a part of a network of computers (such as a local area network ("LAN"), a wide area network ("WAN"), or an Intranet. or a network of networks, such as the Internet. Any or all components of electronic system 400 can be used in conjunction with the subject disclosure.

Although certain examples provided herein can describe a user's information being stored in memory, the user can delete the user information from memory and/or choose to prevent the user information from being stored in memory. In example aspects, the user can adjust appropriate privacy settings to selectively limit the types of user information stored in memory and/or select the memory in which the user information is stored (e.g., locally on the user's device as opposed to remotely on a server). In example aspects, the user information does not include and/or share the specific identification of the user (e.g., the user's name) unless otherwise specifically provided or directed by the user.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM. ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server". "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" arc entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback. e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component. e.g., an application server, or that includes a front end component. e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system, comprising:
   a memory; and
   one or more processors, coupled to the memory, to:
      identify a plurality of contact accounts of an online network that are added by a first user account to form a plurality of relationships with users of the plurality of contact accounts of the online network;
      identify a subset of the plurality of contact accounts that are in relationships with the first user account based on a decay operation that estimates a strength of connection between the subset of contact accounts using weighted scores that are based on respective times at which the first user account added the plurality of contact accounts of the online network;
      responsive to identifying the subset of contact accounts that are in the relationships with the first user account and that have been added by the first user account based on the decay operation, determine a common feature that is shared by at least some of the subset of contact accounts based on comparing user information associated with the subset of contact accounts; and
      provide, based on the common feature, information related to the common feature that is shared by the at least some of the subset of contact accounts to the first user account or one or more of the subset of contact accounts.

2. The system of claim 1, wherein to determine the common feature that is shared by the at least some of the subset of contact accounts, the one or more processors to:
   identify that the common feature is associated with first user information corresponding to a first contact account of the subset of contact accounts and associated with second user information corresponding to a second contact account of the subset of contact accounts; and responsive to identifying that the common feature associated with the first user information and the second user information, infer that the common feature is shared by a third contact account of the subset of contact accounts.

3. The system of claim 1, wherein to identify the subset of contact accounts that are in the relationships with the first user account, the one or more processors to determine that a window of time in which a first contact account of the plurality of contact accounts was added includes a time in which a second contact accounts of the plurality of contact accounts was added.

4. The system of claim 1, the one or more processors further to:

identify a contact account that shares the common feature and has not been added by the first user account with respect to the online network; and provide a suggestion to the contact account or the first user account to add a respective one of the first user account or the contact account to form a new relationship.

5. The system of claim 1, the one or more processors further to:

identify a contact account that shares the common feature and has not been added by the first user account with respect to the online network; and provide a suggestion to the contact account to join an online network group of user accounts that comprise the first user account and share the common feature.

6. A computer-implemented method, comprising:

identifying a plurality of contact accounts of an online network that are added by a first user account to form a plurality of relationships with users of the plurality of contact accounts of the online network;

identifying a subset of the plurality of contact accounts that are in relationships with the first user account based on a decay operation that estimates a strength of connection between the subset of contact accounts using weighted scores that are based on respective times at which the first user account added the plurality of contact accounts of the online network;

responsive to identifying the subset of contacts accounts that are in the relationships with the first user account and that have been added by the first user account based on the decay operation, determining, by one or more processors, a common feature that is shared by at least some of the subset of contact accounts based on comparing user information associated with the subset of contact accounts; and providing, based on the common feature, information related to the common feature that is shared by the at least some of the subset of contact accounts to the first user account or one or more of the subset of contact accounts.

7. The computer-implemented method of claim 6, wherein identifying the subset of contact accounts that are in the relationships with the first user account comprises determining that a window of time in which a first contact account of the plurality of contact accounts was added includes a time in which a second contact accounts of the plurality of contact accounts was added.

8. The computer-implemented method of claim 6, further comprising:

identifying a contact account that shares the common feature and has not been added by the first user account with respect to the online network; and providing a suggestion to the contact account or the first user account to add a respective on of the first user account or the contact account to form a new relationship.

9. The computer-implemented method of claim 6, further comprising:

identifying a contact account that shares the common feature and has not been added by the first user account with respect to the online network; and providing a suggestion to the contact account to join an online network group of user accounts that comprise the first user account and share the common feature.

10. A non-transitory computer-readable storage medium comprising instructions that, responsive to execution by one or more processors, cause the one or more processors to:

identify a plurality of contact accounts of an online network that are added by a first user account to form a plurality of relationships with users of the plurality of contact accounts of the online network;

identify a subset of the plurality of contact accounts that are in relationships with the first user account based on a decay operation that estimates a strength of connection between the subset of contact accounts using weighted scores that are based on respective times at which the first user account added the plurality of contact accounts of the online network;

responsive to identifying the subset of contact accounts that are in the relationships with the first user account and that have been added by the first user account based on the decay operation, determine a common feature that is shared by at least some of the subset of contact accounts based on comparing user information associated with the subset of contact accounts; and provide, based on the common feature, information related to the common feature that is shared by the at least some of the subset of contact accounts to the first user account or one or more of the plurality of contact accounts.

11. The non-transitory computer-readable storage medium of claim 10, the one or more processors further to:

identify a contact account that shares the common feature and has not been added by the first user account with respect to the online network; and provide a suggestion to the contact account or the first user account to add a respective one of the first user account or the contact account to form a new relationship.

12. The non-transitory computer-readable storage medium of claim 10, the one or more processors further to:

identify that the common feature is associated with first user information corresponding to a first contact account of the subset of contact accounts and associated with second user information corresponding to a second contact account of the subset of contact accounts; and responsive to identifying that the common feature associated with the first user information and the second user information, infer that the common feature is shared by a third contact account of the subset of contact accounts.

* * * * *